Dec. 7, 1965  O. E. PHELPS  3,221,856
FRICTION CLUTCH
Filed June 10, 1963  2 Sheets-Sheet 2

United States Patent Office 3,221,856
Patented Dec. 7, 1965

3,221,856
FRICTION CLUTCH
Orville E. Phelps, Toledo, Ohio, assignor to Dana Corporation, Toledo, Ohio, a corporation of Virginia
Filed June 10, 1963, Ser. No. 286,781
1 Claim. (Cl. 192—89)

This invention relates to friction type clutches in general and more particularly to a friction type clutch including drive straps for operatively connecting a pressure plate member to a clutch cover so that torque may be transmitted to the pressure plate member while permitting the same to move in an axial direction.

Prior art devices of this general class employ a driving member and a driven member. The driving member consists of an engine driven flywheel, a cover or support structure and a pressure plate. The cover or support structure is secured to the flywheel and houses the pressure plate and the driven member. A drive strap is provided between the clutch cover and the pressure plate for transmitting drive from the flywheel to the pressure plate while permitting the necessary axial movement of the pressure plate to a position wherein the driven member is compressed between the flywheel and the pressure plate.

Many flexible drive strap arrangements, such as Patent No. 2,770,341, have been utilized to serve as the driving connection between the clutch cover and the pressure plate of a clutch. The above-mentioned patent uses drive straps positioned outside the periphery of the pressure plate so as to avoid interference with the spring element or other portions of the clutch. As a result the structure shown in the patent makes use of a plurality of spaced peripheral bosses or projections on the pressure plate which serve as a means to which the drive straps are connected. To accomplish this, the pressure plate had to be altered to provide additional material at a larger radius from the center of rotation, additional machining operations were also necessary, and the assembly operations were increased, all of which resulted in a noticeable increase in production cost.

Other prior art structures have attempted to avoid the above problems by utilizing radially extending drive straps. This arrangement produced a relatively rigid structure which sacrificed the desired flexibility normally provided by drive straps.

Furthermore, the prior art devices have utilized drive straps which are placed inside the cover member making it difficult, if not impossible, for an individual to inspect the structure and make necessary repairs.

Therefore, it is an object of this invention to provide a clutch structure wherein flexible drive straps are provided to connect the clutch cover with the pressure plate without enlarging or altering the pressure plate itself.

It is another object of this invention to provide drive straps which connect the pressure plate to the cover member for rotation therewith while still being flexible to permit axial movement of the pressure plate.

It is another object of this invention to provide a driving connection between the clutch cover and the pressure plate which does not interfere with the resilient means or other clutch parts.

It is a further object of this invention to provide drive straps of the type mentioned wherein the drive straps additionally serve the function of withdrawing the pressure plate away from the flywheel when the clutch is in its disengaged position.

Still another object of this invention is to reduce the number of parts in the clutch structure by providing drive straps which are integral with the clutch cover itself.

It is still another object of this invention to provide drive straps which have their free ends positioned inwardly of the outer periphery of the pressure plate and which extend through a diaphragm spring or other resilient means without interfering with the operation of the same.

A still further object of this invention is to provide a compact clutch construction which can be easily and inexpensively manufactured.

It is a still further object of this invention to provide a clutch structure which is readily accessible for inspection and repair.

In one preferred embodiment of this invention, a cover or support structure for the clutch is secured to a flywheel and substantially houses a pressure plate and a driven member. A diaphragm spring is fulcrumed on the cover and normally biases the pressure plate member toward the flywheel to compress the driven member between the pressure plate and the flywheel. The pressure plate is driven by a plurality of elongated flexible drive straps which are carried by the cover or support structure and have means extending through the diaphragm spring and connecting the free end of the drive straps with the pressure plate to resiliently drive the pressure plate while permitting axial movement thereof. In another preferred embodiment of this invention the elongated drive straps are formed integral with the cover or support structure.

Further objects and advantages will become apparent to one skilled in the art upon consideration of the following detailed description when taken in connection with the accompanying drawings wherein.

Figure 1:
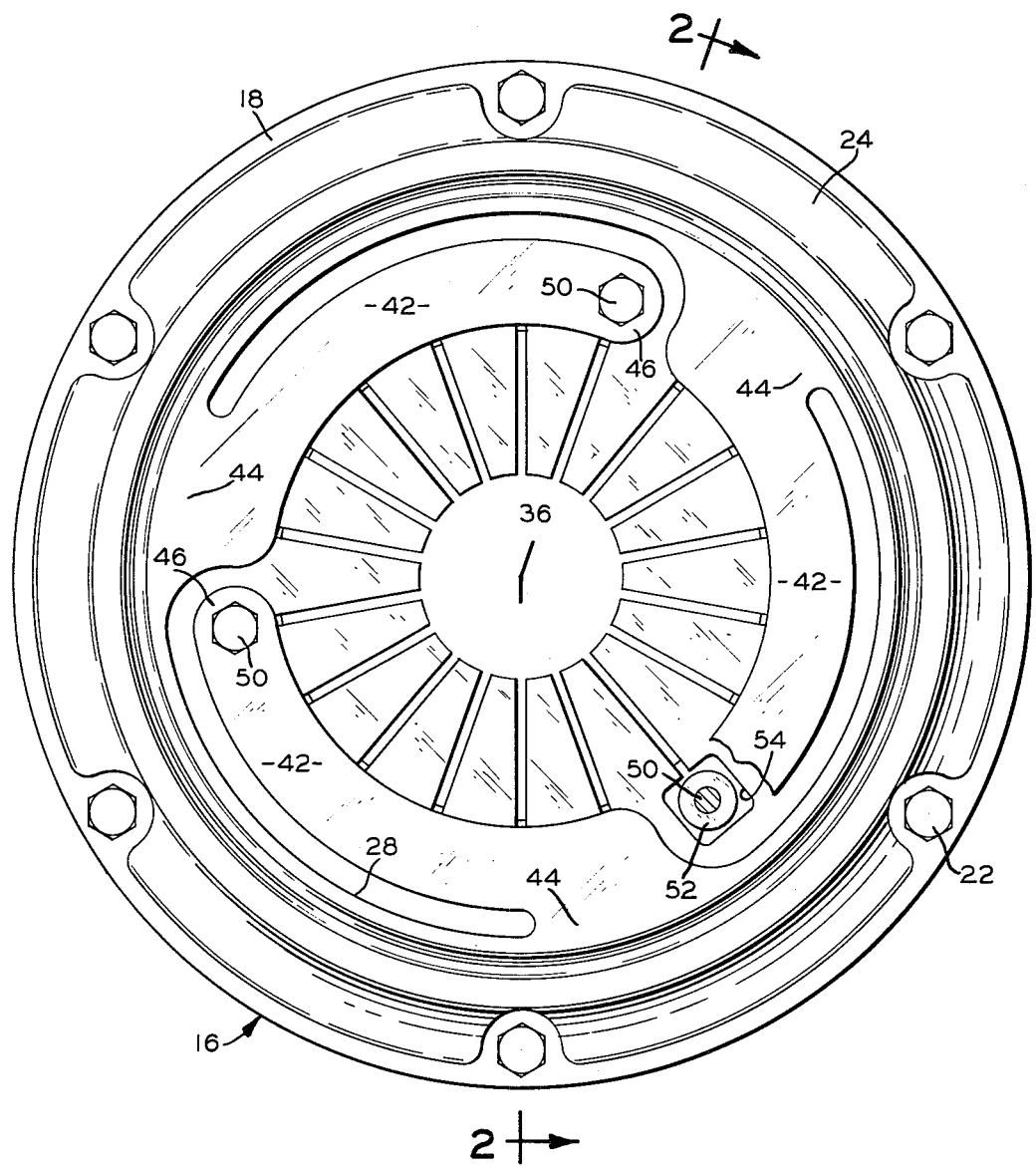
FIG. 1 is a rear elevational view of the clutch structure of the present invention with parts removed for clarity.

Referring now more particularly to the drawings, an annular flywheel 10 of any conventional design is constructed and arranged to rotate with a crankshaft 12 of a vehicle engine (not shown). A transmission input shaft 14 extends through an opening in the flywheel 10 and has one of its ends journaled in a pilot bearing in the crankshaft 12, and has its other end extending into a suitable transmission (not shown). A splined portion is also provided on the input shaft 14 adjacent its journaled end.

Suitably secured to the flywheel 10 and positioned axially adjacent thereto is a clutch cover or support structure 16. More particularly, the cover or support structure 16 is provided with a peripheral flange 18 which is adapted to engage the rear face 20 of the flywheel 10 and is secured thereto by a plurality of bolts 22. Depending axially inwardly from the flange 18 is an enclosed wall portion 24 extending rearwardly a short distance beyond the operating parts of the clutch and terminating in an annular back portion 26. The back portion 26 of the cover or support structure 16 is provided with an enlarged opening 28 disposed centrally therein.

On the inner surface of the back portion 26 of the cover or support structure 16 adjacent the wall portion 24 thereof is an annular rib 30. A diaphragm spring 32 has its outer end fulcrumed on the rib 30 of the cover or support structure 16 and generally comprises an outer Belleville spring portion 34 and an inner lever portion 36 composed of a plurality of levers. The innermost portions of the levers 36 are seated in an annular groove 38 in a shift collar member 40. The shift collar member 40 is suitably mounted on the input shaft 14 for selective reciprocal movement in an axial direction.

A plurality of arcuately extending drive straps or segments 42 (three in this instance) are formed integrally with the cover or support structure 16 on the innermost portion thereof. The cover or support structure 16 and arcuate drive strap segments 42 may be formed from a single stamping and the drive strap segments are connected to the cover or support structure by a radially extending web portion 44. The arcuate drive strap segments 42 are positioned radially inwardly from the cover or support structure 16 and are concentric therewith. The drive strap segments 42 are of a resilient material having free ends 46 which are adapted to be connected to an annular pressure plate member 48 to normally hold the pressure plate member 48 in a position retracted from the flywheel 10.

To connect the free end 46 of each drive strap segment 42 to the pressure plate member 48, a bolt 50 extends through the free end of each drive strap through an aligned opening in an annular bushing 52 and is threaded into the pressure plate 48. The diaphragm spring 32 is provided with three square openings 54 in the lever portion 36 thereof to accommodate the annular bushings 52 which bushing will serve as a spacer between the pressure plate member 48 and the cover or support structure 16 to permit free movement of the diaphragm spring 32.

The pressure plate member 48 is provided with an annular rib portion 56 spaced radially inwardly from the annular rib 30 and adjacent the annular bushing member 52. The rib portion 56 engages the inner portion of the Belleville spring portion 34 and when the shift collar member 40 is in the position shown in FIG. 2 biases the pressure plate member 48 toward the flywheel 10 to compress a driven member, indicated generally at 58, against the flywheel.

The driven member 58 is shown consisting of an annular disk 60 having the usual friction facing material 62, 64 suitably secured on opposite sides thereof. Radially inwardly, the disk 62 is riveted to a driving hub 66 which hub is internally splined for axial movement on the cooperating spline portion provided on the input shaft 14 of the transmission.

Figure 2:
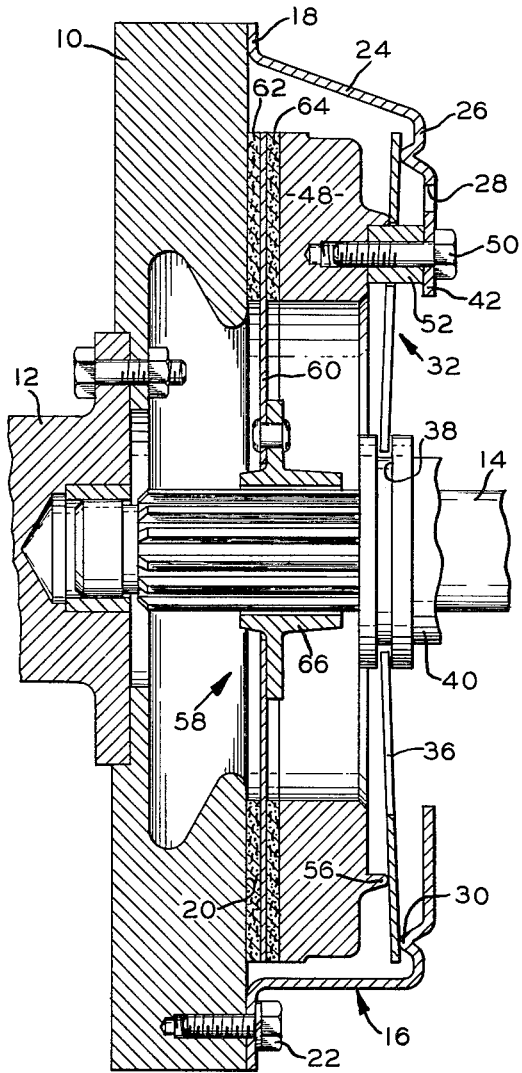
FIG. 2 is a cross sectional view of the clutch structure taken substantially along lines 2—2 of FIG. 1 showing the clutch in one of its positions.

In operation of the clutch with the parts in the position shown in FIG. 2, the shift collar 40 is in its leftward position and the diaphragm spring 32 assumes its normal configuration wherein it fulcrums about the rib 30 on the cover or support structure 16 and has the inner portion of the Bellevile spring 34 engaging the rib 56 on the pressure plate member 48 biasing the pressure pate member to the left to compress the driven member 58 between the flywheel 10 and the pressure plate member. This results in torque being transmitted from the flywheel 10 directly to the driven member 58 as well as to the cover or support structure 16 and through the drive strap segments 42 formed integral with the cover or support structure through the annular bushing 52 and the bolts 50 connecting the drive strap segments 42 to the pressure plate member and from the pressure plate member to the driven member 58 and finally to the input shaft 14 of the transmission.

Figure 3:
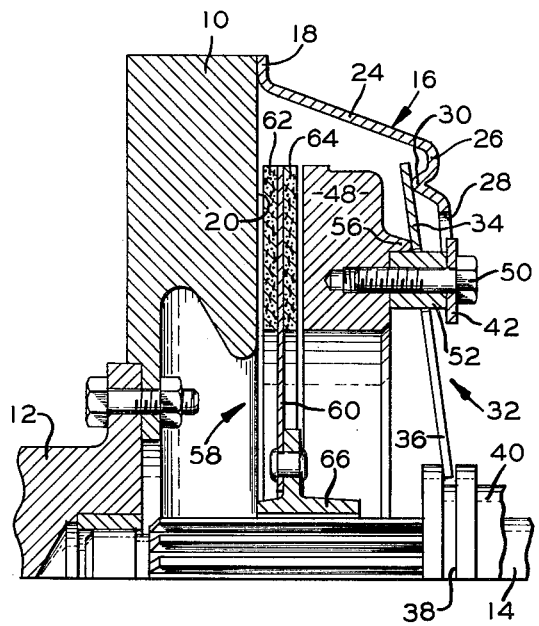
FIG. 3 is a partial sectional view showing the clutch in another position.

Upon selective movement of the shift collar 40 to the right as shown in FIG. 3 the shift collar forces the lever portions 36 of the diaphragm spring 32 to be pulled away from the flywheel 10 at which time the outer periphery of the Belleville spring portion 34 will fulcrum about annular rib 30 tending to gradually assume a flattened position. As this deflection progresses the drive strap segments 42 will respond to simultaneously bias the pressure plate member 48 in a direction away from the flywheel 10 causing the clutch to become disengaged.

From the foregoing it is apparent that the Belleville spring portion 34 will serve as a means for urging the clutch into its normally engaged position while the drive strap segments 42 serve as a means to bias the pressure plate member 48 away from the flywheel 10 when the Belleville spring portion 34 has been moved to relieve the biasing pressure on the pressure plate member. Thus, it is apparent that the urging force supplied by the Belleville spring portion 34 against the pressure plate member 48 is of greater magnitude than the biasing force of the drive strap segments 42.

By connecting the free ends 46 of the drive strap segments 42 to the pressure plate member 48 it is apparent that the drive straps serve to support, drive and permit axial movement of the pressure plate member while also serving to bias the pressure plate member away from the flywheel 10 when the diaphragm spring pressure on the pressure plate is relieved.

Throughout the above operations it is apparent that since the openings 54 are provided in the diaphragm spring 32, the connection between the drive strap segments 42 and the pressure plate member 48 will in no way interfere with the operation of the diaphragm spring.

Since the drive strap segments 42 and the cover or support structure 16 are formed integrally by preferably stamping the two parts from a single blank, and by the utilization of a diaphragm spring 32, it is apparent that the number of parts of the clutch have been greatly reduced while still providing a satisfactory operating unit. Furthermore, with the construction shown, the clutch parts are readily accessible for inspection and repair.

It will be obvious that while the foregoing specification and accompanying drawings disclose and illustrate a drive connection for use with a normally engaged clutch, the invention is not limited thereto but may also encompass a clutch which is normally biased to the disengaged position.

While only the preferred embodiments of this invention have been shown and described, it will be understood that modifications and variations can be made without departing from the scope of the invention as defined by the following claim.

What is claimed is:

In a clutch for cooperation with a flywheel, the combination comprising, (a) a support structure connected to the flywheel for rotation therewith and including an annular fulcrum point disposed on the internal surface thereof and having a central axially extending opening therein bordered by an internal surface, (b) an annular axially movable pressure plate member disposed within said support structure and having an annular rib portion on the back face thereof, (c) a driven member having friction surfaces disposed thereon and positioned within said support structure between said pressure plate member and the flywheel, (d) a diaphragm spring having the outer portion thereof fulcrumed about said fulcrum point on said support structure and having an intermediate portion engageable with said rib portion on said pressure plate member for normally effecting movement of said pressure plate member toward the flywheel to cause engagement of the friction surfaces on the driven member with the pressure plate member and the flywheel, (e) said diaphragm spring including lever means on the radially inner portion thereof and having a plurality of spaced openings therethrough, said lever means being operative in one position to permit said spring to move said pressure plate member toward the flywheel and operative in a second position to permit said pressure plate member to move away from the flywheel, (f) a plurality of resilient circumferentially elongated segments each having one end formed integrally with said support structure at said internal surface thereof, each segment located radially inwardly of said internal surface and having a free end circumferentially spaced from its one end, (g) and means extending through said openings and connecting the free ends of said elongated segments with said pressure plate member at circumferentially spaced points disposed radially inward from the periphery of said pressure plate member whereby said elongated segments drive said pressure plate member while permitting axial movement thereof and move said pressure plate member away from said flywheel when said diaphragm spring is in said second position.

References Cited by the Examiner

UNITED STATES PATENTS

| | | | |
|---|---|---|---|
| 2,047,737 | 7/1936 | Lane. | |
| 2,073,146 | 3/1937 | Gardiner | 192—68 |
| 2,177,362 | 10/1939 | Eason | 192—68 |
| 2,300,187 | 10/1942 | Wemp | 192—68 |
| 2,770,341 | 11/1956 | Wobrock. | |
| 3,128,639 | 4/1964 | Hein et al. | 192—112 X |

DAVID J. WILLIAMOWSKY, *Primary Examiner.*

ROBERT C. RIORDON, *Examiner.*